US007657420B2

(12) United States Patent
Maxwell, III

(10) Patent No.: US 7,657,420 B2
(45) Date of Patent: Feb. 2, 2010

(54) SYSTEMS AND METHODS FOR THE GENERATION OF ALTERNATE PHRASES FROM PACKED MEANING

(75) Inventor: John T. Maxwell, III, Cupertino, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 640 days.

(21) Appl. No.: 10/739,349

(22) Filed: Dec. 19, 2003

(65) Prior Publication Data

US 2005/0137855 A1 Jun. 23, 2005

(51) Int. Cl.
*G06F 17/28* (2006.01)
(52) U.S. Cl. .................. 704/2; 704/4; 704/5; 704/7; 704/8; 704/9; 715/264
(58) Field of Classification Search ............... 704/1–10; 715/264
See application file for complete search history.

(56) References Cited

U.S. PATENT DOCUMENTS

| | | | |
|---|---|---|---|
| 5,438,511 A | 8/1995 | Maxwell | |
| 5,727,222 A | 3/1998 | Maxwell | |
| 5,819,210 A | 10/1998 | Maxwell | |
| 5,903,860 A | 5/1999 | Maxwell | |
| 5,983,169 A * | 11/1999 | Kozma | ................... 704/2 |
| 6,064,953 A | 5/2000 | Maxwell | |
| 6,223,150 B1 | 4/2001 | Duan et al. | |

(Continued)

OTHER PUBLICATIONS

Martin Kay, "Chart Generation in Proceedings of the 34th Annual Meeting of the Association for Computational Linguistics", pp. 200-204, Santa Cruz, California.

Hadar Shemtov, "Ambiguity Management in Natural Language Generation", Ph.D. Dissertation, Stanford University, Jun. 1997.

*Primary Examiner*—David R Hudspeth
*Assistant Examiner*—Lamont M Spooner
(74) *Attorney, Agent, or Firm*—Fay Sharpe LLP

(57) ABSTRACT

Techniques are provided to generate alternate phrases from a packed meaning representation. The semantics of input items in a packed meaning representation are matched against a lexicon to determine initial entries in a phrasal information structure. Context, syntax and semantic information describing each phrasal entry are added to the phrasal information structure. Linear or other implications are used to determine a set of unordered rewrite rules. The unordered rewrite rules associate semantic information with pseudofacts such that a complete set of choices from the set of disjunctions in the packed meaning representation is selected. Semantic information associated with the unordered rewrite rules identifies entries in the phrasal information structure to be updated with the pseudofact of the unordered rewrite rule. Entries in the phrasal information structure not associated with false contexts are combined based on ordered rewrite rules. The ordered rewrite rules are based on the language of the packed meaning representation. Source information associated with each new entry in the phrasal information structure reflects the phrasal entry identifiers of the entries used to determine the new entry. For any set of entries in the phrasal information structure produced by an ordered rewrite rule, the context of a missing semantic fact is subtracted from the context of the entry lacking the semantic fact. Entries associated with a false context are discarded and entries sharing the same syntax and semantic information are merged. Any entries in the phrasal information structure associated with the "ALL" pseudofact are then determined. Alternate phrases are generated based on the source information for the entry in the phrasal information structure associated with the "ALL" pseudofact.

38 Claims, 12 Drawing Sheets

U.S. PATENT DOCUMENTS

| | | |
|---|---|---|
| 6,260,008 B1 * | 7/2001 | Sanfilippo .................... 704/9 |
| 6,282,507 B1 | 8/2001 | Horiguchi et al. |
| 6,332,118 B1 | 12/2001 | Yamabana |
| 6,356,865 B1 | 3/2002 | Franz et al. |
| 6,442,524 B1 | 8/2002 | Ecker et al. |
| 6,879,950 B1 * | 4/2005 | Mackie et al. ................ 704/9 |
| 6,901,360 B1 * | 5/2005 | Dymetman et al. ........... 704/2 |
| 6,910,003 B1 | 6/2005 | Arnold et al. |
| 2002/0046018 A1 | 4/2002 | Marcu et al. |
| 2003/0163301 A1 | 8/2003 | Maxwell |
| 2003/0171913 A1 | 9/2003 | Maxwell |
| 2004/0122658 A1 | 6/2004 | Lamping et al. |
| 2004/0139060 A1 | 7/2004 | Maxwell |
| 2004/0230415 A1 | 11/2004 | Riezler |

* cited by examiner

I SAW THE GREEN LIGHT

*FIG. 4*

| WORD | SYNTACTIC INFORMATION | SYNTACTIC INFORMATION |
|---|---|---|
| JE | NP_ISG(X) | JE(X) |
| AI | AUX_ISG(X,Y) | PRES(X) PERF(X) |
| VU | V_PPT(X,Y,Z) | VOIR(X,Y,Z) |
| SCIE | V_ISG(X,Y,Z) | SCIER(X,Y,Z) PRES(X) |
| LE | DET_MASC(X) | LE(X) |
| LA | DET_FEM(X) | LE(X) |
| VERT | ADJ_MASC(X) | VERT(X) |
| VERTE | ADJ_FEM(X) | VERT(X) |
| LUMIERE | N_FEM(X) | LUMIERE(X) |
| FEU | N_MASC(X) | FEU(X) |

| Left Hand Syntactic Information | Assignment | Right Hand Syntactic Information |
|---|---|---|
| N_MASC(X) | → | N_MASC(X) ADJ(X) |
| N_FEM(X) | → | N_FEM(X) ADJ(X) |
| NP(X) | → | DET_MASC(X) N_MASC(X) |
| NP(X) | → | DET_FEM(X) N_FEM(X) |
| VP_ISG(X,Y) | → | V_ISG(X,Y,Z) NP(Z) |
| VP_ISG(X,Y) | → | AUX_ISG(X,Y) VP_PPT(X,Y) |
| VP_PPT(X,Y) | → | V_PPT(X,Y,Z) NP(Z) |
| S(X) | → | NP_ISG(Y) VP_ISG(X,Y) |

| INDEX | Contexted Fact | Description |
|---|---|---|
| 1 | JE(1) | "I" |
| 2 | PRES(0) | |
| 3 | P1->PERF(0) | "Past Tense -> Present Perfect)" |
| 4 | P1->VOIR(01,2) | "See" |
| 5 | P2->SCIER(0,1,2) | "Cut with saw" |
| 6 | LE(2) | "the" |
| 7 | VERT(2) | "Green" |
| 8 | Q1->LUMIERE(2) | "Light(rugular)" |
| 9 | Q2->FEU(2) | "Light(traffic)" |
| 10 | TRUE<->ONE_OF(P1,P2) | |
| 11 | TRUE<->ONE_OF(Q1,Q2) | |

| Syntactic Information | Operator | Pseudofact |
|---|---|---|
| VOIR(0,1,2) PERF(0) | -o | P |
| SCIER(0,1,2) | -o | P |
| LUMIERE(2) | -o | Q |
| FEU(2) | -o | Q |
| JE(1) P PRES(0) LE(2) Q VERT(2) | -o | ALL |

J' AI VU LA LUMIERE VERTE

FIG. 9

J' AI VU LE FEU VERT

FIG. 10

JE SCIE LA LUMIERE VERTE

FIG. 11

JE SCIE LE FEU VERT

FIG. 12

| Phrasal Identifier | Contact Information | Syntactic Information | Semantic Information | Source Information |
|---|---|---|---|---|
| 1 | TRUE | NP_1SG(1) | JE(1) | [JE] |
| 2 | P1 | AUX_1SG(0,1) | PRES(0) PERF(0) | [AI] |
| 3 | P1 | V_PPT(0,1,2) | VOIR(1,2) | [VU] |
| 4 | P2 | V_1SG(0,1,2) | P PRES(0) | [SCIE] |
| 5 | TRUE | DET_MASC(2) | LE(2) | [LE] |
| 6 | TRUE | DET_FEM(2) | LE(2) | [LA] |
| 7 | TRUE | ADJ_MASC(2) | VERT(2) | [VERTE] |
| 8 | TRUE | ADJ_FEM(2) | VERT(2) | [VERT] |
| 9 | Q1 | N_FEM(2) | Q | [LUMIERE] |
| 10 | Q2 | N_MASC(2) | Q | [FEU] |
| 11 | Q1 | N_FEM(2) | Q VERT(2) | [9+8] |
| 12 | Q2 | N_MASC(2) | Q VERT(2) | [10+7] |
| 13 | TRUE | NP(2) | Q | [5+10, 6+9] |
| 14 | TRUE | NP(2) | Q VERT(2) | [5+12, 6+11] |
| 15 | FALSE | VP_PPT(0,1) | VOIR(0,2) LE(0,1,2) Q | [3+13] |
| 16 | P1 | VP_PPT(0,1) | VOIR(0,1,2) LE(2) Q VERT(2) | [3+14] |
| 17 | FALSE | VP_1SG(0,1) | P PRES(0) LE(2) Q | [4+13] |
| 18 | TRUE | VP_1SG(0,1) | P PRES(0) LE(2) Q VERT(2) | [4+14, 2+16] |
| 19 | TRUE | S(0) | ALL | [1+18] |
| . | . | . | . | . |
| N | . | . | . | . |

FIG. 13

{JE SCIE |J'AI VU} {LE FEU VERT | LA LUMIERE VERTE}
FIG. 15
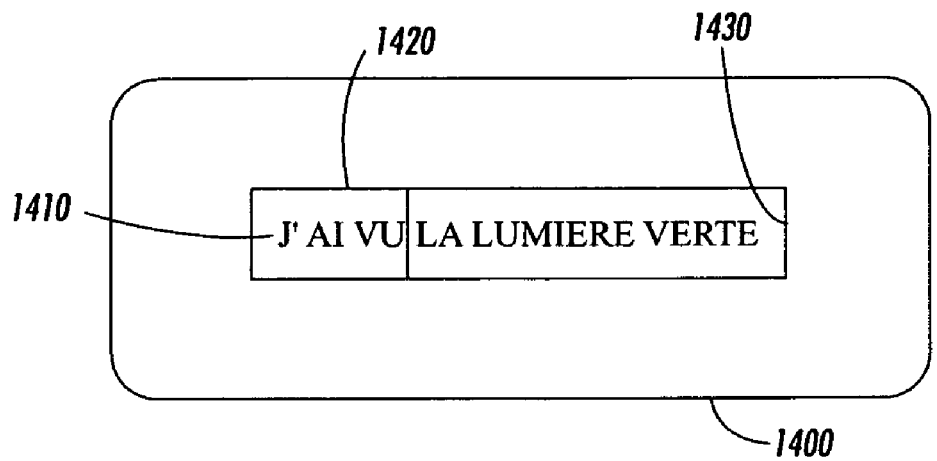
FIG. 16
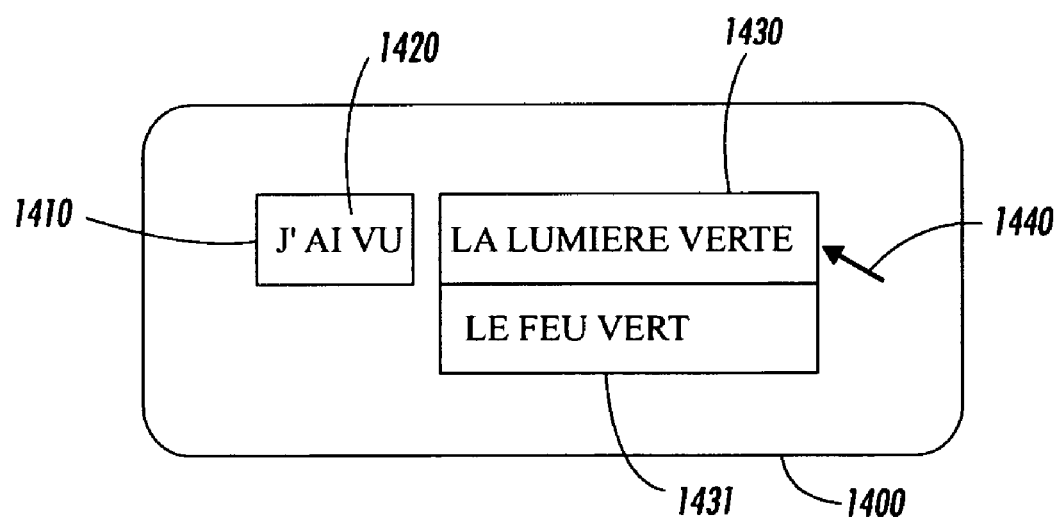
FIG. 17

SYSTEMS AND METHODS FOR THE GENERATION OF ALTERNATE PHRASES FROM PACKED MEANING

INCORPORATION BY REFERENCE

This Application herein incorporates by reference: J. T. MAXWELL, III, U.S. patent application Ser. No. 10/338, 846, entitled "Systems and Methods for Efficient Conjunction of Boolean Variables", filed Jan. 9, 2002; S. Riezler et al., U.S. patent application Ser. No. 10/435,036, entitled "Systems and Methods for Text Condensation", filed May 12, 2003; J. T. MAXWELL, III et al., U.S. patent application Ser. No. 10/260,652, entitled "Generating with Lexical Functional Grammars", filed Sep. 27, 2002; J. T. MAXWELL, III, U.S. patent application Ser. No. 10/256,658, entitled "Generating with Lexical Functional Grammars", filed Sep. 27, 2002; J. T. Maxwell, III et al., U.S. Pat. No. 6,064,953, entitled "Method for Creating a Disjunctive Edge Graph From Subtrees During Unification", issued May 16, 2000; J. T. Maxwell, III et al., U.S. Pat. No. 5,903,860, entitled "Method of Conjoining Clauses During Unification Using Opaque Clauses", issued May 11, 1999; J. T. Maxwell, III et al., U.S. Pat. No. 5,819,210, entitled "Method of Lazy Contexted Copying During Unification", issued Oct. 6, 1998; J. T. Maxwell, III, U.S. Pat. No. 5,727,222, entitled "Method of Parsing Unification Based Grammars Using Disjunctive Lazy Copy Links", Mar. 10, 1998; J. T. Maxwell, III et al., U.S. Pat. No. 5,438,511, entitled "Disjunctive Unification", issued Aug. 1, 1995; each, in their entirety.

BACKGROUND OF THE INVENTION

1. Field of Invention

This invention relates to generating information from packed representations of meaning.

2. Description of Related Art

Conventional natural language generation systems operate on a single meaning representation to generate alternate phrases that have meaning. Conventional translation systems parse a phrase in the source language into a set of meanings, choose a meaning from the set, transfer the meaning into a set of meanings appropriate for the target language, choose a meaning from this set, and then generate from this meaning. However, conventional translation systems sometimes choose the wrong meaning. This can be a problem when the source language contains an ambiguity that the target language does not contain. For instance, the Japanese word "bei" can mean either "rice" or "the United States". If a conventional translation system makes the wrong choice, the reader can become hopelessly confused.

An alternative is to translate all the meanings. Techniques are available for obtaining a packed representation of the meaning of the source sentence and transferring the packed representation into a packed meaning representation appropriate for the target language. The resulting packed meaning representation must be unpacked in order to generate. Martin Kay describes a conventional method for generating alternate phrases from a chart in "Chart Generation" in Proceedings of the 34th Annual Meeting of the Association for Computational Linguistics", pp. 200-204, Santa Cruz, Calif., herein incorporated by reference in its entirety. However, these conventional generation techniques are expensive since a natural language sentence can have an exponential number of meanings.

SUMMARY OF THE INVENTION

Thus, systems and methods for the efficient generation of alternate phrases from a packed meaning representation would be useful. The systems and method of this invention typically provide for the generation of alternate phrases from a packed meaning representation in order polynomial time.

The systems and methods according to this invention also provide for the use of statistical methods to select the most likely phrases from a set of alternate phrases. The statistical selection of phrases may be based on corpus analysis, fluency indicators or any other known or later developed method. The systems and methods according to this invention provide for the selection of the best alternate phrase for a context. The systems and methods according to this invention may also provide for eliminating the need to understand the actual meaning of ambiguous sentences by selecting translated alternate phrases that preserve the scope of ambiguity contained in the original phrase.

BRIEF DESCRIPTION OF THE DRAWINGS

FIG. 4 is an exemplary English language sentence;

FIG. 5 shows a portion of an exemplary lexicon for a language;

FIG. 6 is an exemplary data structure for storing ordered rewrite rules according to one aspect of this invention;

FIG. 7 is an exemplary packed meaning representation;

FIG. 8 is an exemplary data structure for storing unordered rewrite rules according to this invention;

FIG. 9 shows a first alternate phrase generated according to one aspect of this invention;

FIG. 10 shows a second alternate phrase generated according to one aspect of this invention;

FIG. 11 shows a third alternate phrase generated according to one aspect of this invention;

FIG. 12 shows a fourth alternate phrase generated according to one aspect of this invention;

FIG. 13 shows an exemplary phrasal information structure according to one aspect of this invention;

FIG. 15 shows a first exemplary user interface for presenting alternate phrases according to one aspect of this invention;

FIG. 16 shows a second exemplary user interface for presenting alternate phrases according to one aspect of this invention;

FIG. 17 shows another aspect of the second exemplary user interface for presenting alternate phrases according to this invention;

DETAILED DESCRIPTION OF EXEMPLARY EMBODIMENTS

Figure 1:
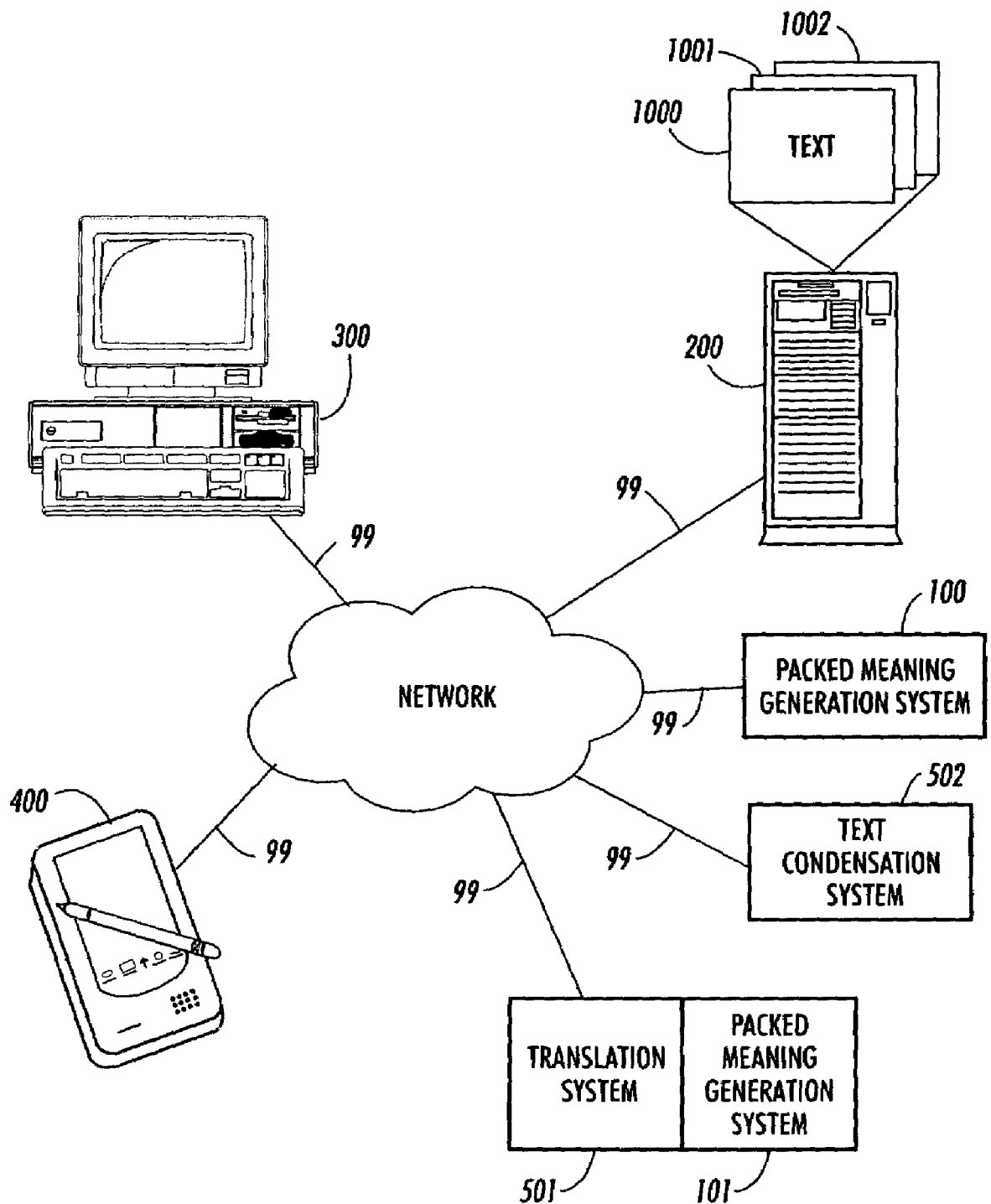
FIG. 1 is an overview of the use of various exemplary packed meaning generation managers or systems according to this invention.

FIG. 1 is an overview of the use of various exemplary packed meaning generation managers or systems according to this invention. A packed meaning generation system 100, a web-enabled personal computer 300, a web-enabled tablet personal computer 400, a text condensation system 502 and a translation system 501 containing an embedded packed meaning generation manager or system 100, are each connected via communication link 99.

In a first exemplary embodiment according to this invention, a user of web-enabled personal computer 300 requests a translation of the text 1000 contained in the information repository 200.

The request is forwarded via communications link 99 to the translation system 501. The translation system 501 retrieves the text 1000 from the information repository and encodes the retrieved text 1000 as a packed meaning representation.

It will be apparent that in various exemplary embodiments according to this invention, the information repository 200 may be a web server, a digital library or any known or later developed information source. Moreover, the information repository 200 may serve documents encoded in XML, HTML, WML, Microsoft Word,® Microsoft Excel,® Adobe PDF,® or any other known or later developed format without departing from the spirit or scope of this invention.

In various exemplary embodiments according to this invention, the translation system 501 applies transfer functions to the elements of the retrieved packed meaning representation. The resultant translated packed meaning representation reflects each of the meanings in the target translation language. The translated packed meaning representation is then transferred to the embedded packed meaning generation manager or system 100 within the translation system 501. The embedded packed meaning generation manager 100 generates each of the alternate phrases that are the translation.

In various other exemplary embodiments according to this invention, additional information is applied to rank and/or select likely alternate phrases for the target language. Since the alternate meanings are preserved after the translation, additional information useful in resolving ambiguities for the target language may also be preserved. Moreover, additional information such as statistical models, of the target translation language may be used to determine the most likely alternate phrases. The most likely translated alternate phrases are then forwarded to the web-enabled personal computer 300 as the translation of the text 1000. Alternatively, each of the phrases is annotated in the text and forwarded via the communication link 99 to the web-enabled personal computer 300.

In various exemplary embodiments according to this invention, access to the alternate phrases generated by the packed meaning generation manager or system 100 is mediated by an alternate phrase user interface. The alternate user interface may display all the choices or may selectively display alternate phrases based on optional ranking of the alternate phrases. The alternate phrase user interface may be located on a web server, the web-enabled personal computer 400 or at any other location accessible via communication link 99.

In a second exemplary embodiment according to this invention, a user of web-enabled tablet personal computer 400 requests a summary of the text 1001 contained within the information repository 200. The summarization request is forwarded via the communications links 99 to the text condensation system 502. The text condensation system 502 retrieves the text 1001 from the information repository 200.

In various embodiments according to this invention, the retrieved text 1001 is encoded or parsed into a packed meaning representation by the text condensation system 502. However, it will be apparent that the text may be encoded into a packed representation of meaning at the information repository 200 or any location accessible via communication link 99. The text condensation system 502 then applies condensation transfer functions to the elements of the packed meaning representation. The condensation transfer functions determine a summary of the packed meaning representation.

The text condensation system 502 then forwards the condensed packed meaning representation to the packed meaning generation system 100. The packed meaning generation system 100 generates each of the alternate phrases from the packed meaning representation. The packed meaning generation manager 100 may optionally rank and/or select alternate phrases using statistical models, rules or other information useful in determining the phrases rankings. The best condensation is then returned to the user of web-enabled personal computer 400 via the communication link 99.

Figure 2A:
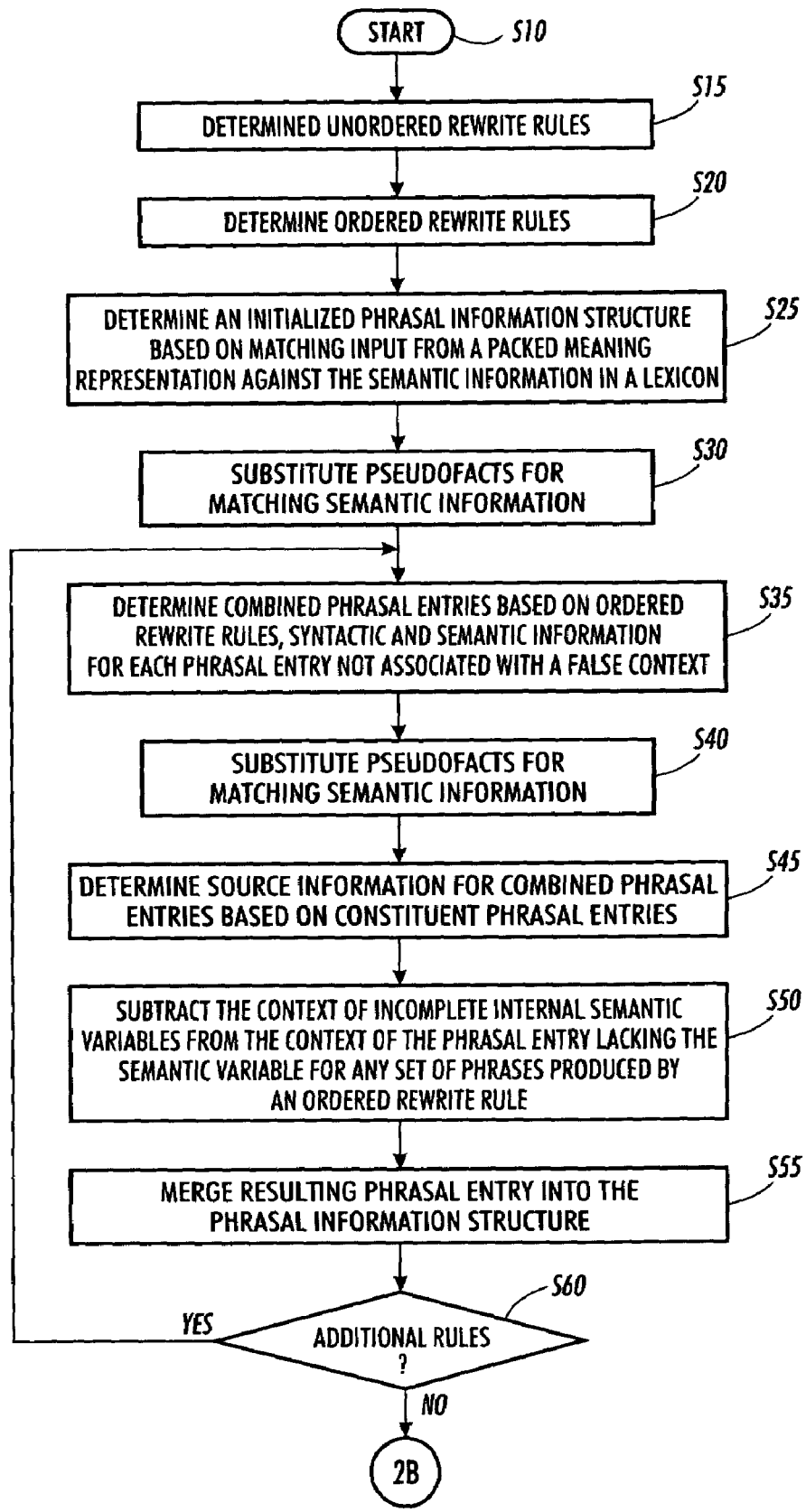
FIG. 2 comprising 2A-2B is an exemplary method of packed meaning generation according to this invention.
Figure 2B:
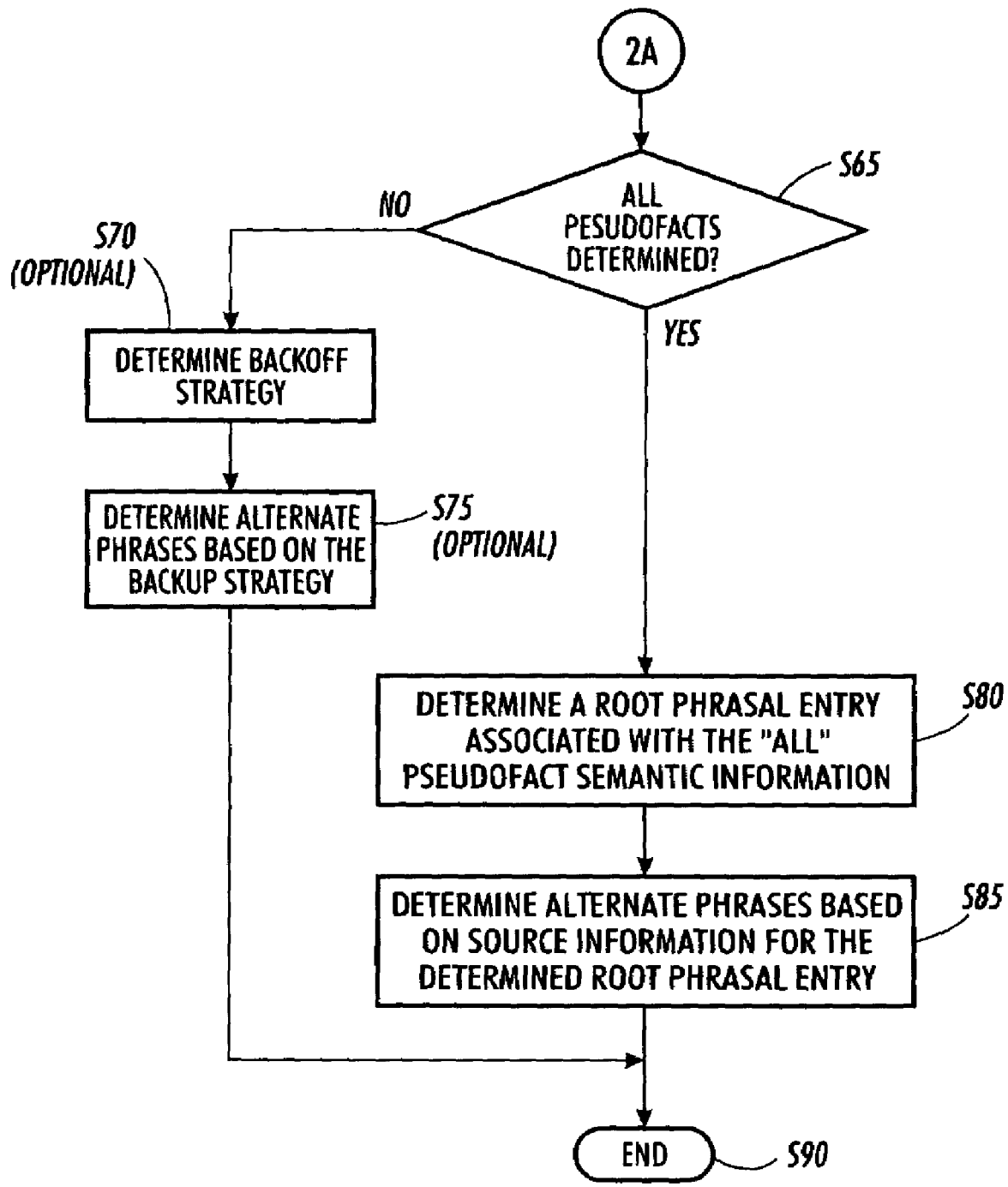

FIG. 2 comprising 2A-2B is an exemplary method of packed meaning generation according to this invention. The process begins at step S10 and control immediately continues to step S15.

The unordered rewrite rules are determined from the input in step S15. It will be apparent that the term ordering merely refers to the ordering of the features within a rule. The exemplary unordered rewrite rules are determined based on linear implications derived from linear logic. However, it will be apparent that any method of determining unordered rewrite rules that selects a complete set of choices from the disjunctions contained in the input may be used in the practice of this invention. After the unordered rewrite rules have been determined, control continues to step S20.

In step S20, ordered rewrite rules are determined. The ordered rewrite rules may be previously determined and stored in a memory, determined dynamically based on features associated with the input or elements of the packed meaning representation or determined using any other known or later developed method. After the ordered rewrite rules have been determined, control continues to step S25.

In step S25, the initial entries in the phrasal information structure are determined. The input meanings or elements in the packed meaning representation are determined. The input meanings are semantic information that is used as an index into a lexicon to determine words or phrases matching the input meanings. Entries in the phrasal information structure are created for each of the matched words or phrases. Each entry in the phrasal information structure is associated with the semantic information, syntactic information and source information indicating the origin of the entry in the lexicon.

In step S30, pseudofacts are substituted for matching semantic information. That is, the unordered rewrite rules are applied to the entries in the phrasal information structure. The semantic information for an entry matching an unordered rewrite rule is substituted with the pseudofact corresponding to the unordered rewrite rule. Control then continues to step S35.

The combined entries in the phrasal information structure are determined based on the ordered rewrite rules, the syntactic information and the semantic information for each entry not associated with the false context in step S35. The entries in the phrasal information structure that share semantic and syntactic information and which satisfy the constraints of the ordered rewrite rule are combined into new entries.

After the combined entries in the phrasal information structure have been determined, control continues to step S40.

The pseudofacts are again substituted for matching semantic information in step S40. That is, the unordered rewrite rules are applied to the entries in the phrasal information structure. The semantic information for an entry matching an unordered rewrite rule is substituted with the pseudofact corresponding to the unordered rewrite rule. Control then continues to step S45.

In step S45, the source information for the combined entry is determined based on each of the combined entries. That is, if the entries "[9]" and "[8]" are combined, the source information for the combined entry is "[9+8]" After the source information for the combined entry has been determined, control continues to step S50.

For entries in the phrasal information structure produced by a rewrite rule, the context of any missing fact in the set of entries is optionally subtracted from the context of any produced entry in step S50 if the fact's semantic variables are internal. Thus, if the entry with the missing fact is in the "TRUE" context and the context of the fact is "TRUE", then the context of the entry with the missing fact is set to "TRUE-TRUE" which is "FALSE". Setting the context of the entry to "FALSE" removes the entry in the phrasal information structure from further consideration. After the contexts of the entries have been adjusted, control continues to step S55.

Entries in the phrasal information structure with the same syntactic and semantic information are merged in step S55. Entries that have the same values in the syntactic and semantic information mean the same thing. The context for the entries is disjoined to create the context for the new merged entry in the phrasal information structure and the source information is combined.

In step S60, a determination is made as to whether there are additional ordered rewrite rules to be applied. In various exemplary embodiments according to this invention, the ordered rewrite rules are applied to the entries in the phrasal information structure as a match occurs. As ordered rewrite rules are dynamically applied to the entries in the phrasal information structure, new entries in the phrasal information structure are determined. If it is determined that additional rules are to be applied, control jumps immediately to step S35. In step S35, the entries in the phrasal information structure are combined. Steps S35-S55 are repeated until it is determined that there are no additional ordered rewrite rules to be applied. Control then continues to step S65.

In step S65, a determination is made whether the "ALL" pseudofact has been determined. If it is determined that the "ALL" pseudofact has not been determined, control continues to optional step S70 where a backoff strategy is determined. That, is if the "ALL" pseudofact has not been determined, all the rules have been applied to the entries in the phrasal information structure and no changes have been detected. Thus, the packed meaning representation may refer to a meaning that cannot be expressed by the ordered rules. It will be apparent that in various other exemplary embodiments, such meaning may be handled at other levels of processing. For example, transfer rules may be encoded to handle inexpressible meanings by flagging the meaning before generation. Specific rules and/or heuristics may then be used to handle these meanings. In still other exemplary embodiments according to this invention, the backoff strategy is determined based on statistical models and the like. After the backoff model has been determined, control continues to optional step S75 where the backup off strategy is applied to determine the alternate phrases. After the alternate phrases are determined for the packed meaning representation based on the backoff strategy, control continues to step S90.

If the determination is made in step S65 that the "ALL" pseudofact has been determined, control continues to step S80. In step S80, the entry in the phrasal information structure associated with the "ALL" pseudofact is determined to be the root entry of a tree of alternate phrases. Control then continues to step S85.

In step S85 alternate phrases are determined based on the source information for the determined root entry. The entry in the phrasal information structure associated with the "ALL" pseudofact may be viewed as the root of a tree of phrase entries. The tree represents a visualization of the alternate phrases that can be generated from the packed meaning representation. After determining the alternate phrases, control continues to step S90 where the process ends.

Figure 3:
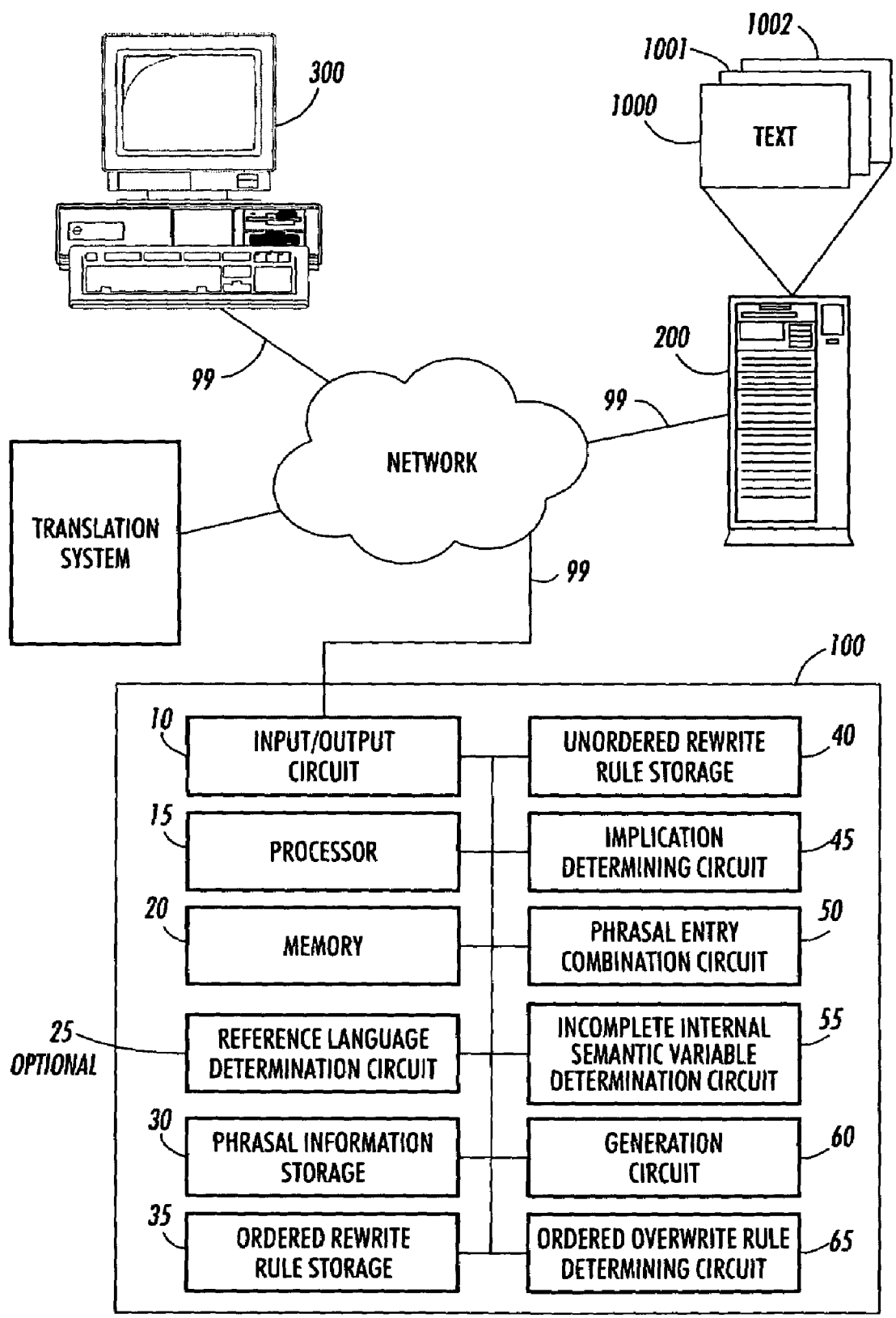
FIG. 3 is an exemplary packed meaning generation manager or system according to this invention.

FIG. 3 is an exemplary packed meaning generation manager or system 100 according to this invention. The packed meaning generation manager or system 100 comprises: a processor 15; a memory 20; an optional reference language determination circuit 25; a phrasal information storage 30; an ordered rewrite rule storage 35; an unordered rewrite rule storage 40; an implication determination circuit 45; a phrasal entry combination circuit 50; an incomplete internal semantic variable determination circuit 55, a generation circuit 60 and an ordered rewrite rule determination circuit 65; each connected via the input/output circuit 10 to the communication link 99. The packed meaning generation manager or system 100 is also connected via the communication link 99 to an information repository 200 serving texts 1000-1002, a web-enabled personal computer 300 and a translation system 501.

In one of the various exemplary embodiments according to this invention, a user of web-enabled personal computer 300 initiates a request to translate text 1000. The text 1000 may be selected based on user input such as highlighting, keyboard or voice selection of a file. However, it will be apparent that any method of selecting the text may be used without departing from the scope of this invention.

The translation request is then forwarded over the communication link 99 to the translation system 501. The translation system 501 determines a packed meaning representation for each portion of the text 1000 and applies transfer functions to determine a packed meaning representation for the target language. Text portions may be sentences, paragraphs or any other discourse structure. The translation system 501 then forwards the transferred packed meaning representation of the text 1000 to the packed meaning generation manager 100 via communication link 99. The processor 15 then activates the input/output circuit 10 to retrieve the packed meaning representation associated with the selected text 1000. The packed meaning representation is then stored in memory 20.

An optional reference language determination circuit 25 is then activated to determine the reference language of the packed meaning representation. The reference language is determined based on XML, HTML tags embedded in the text, dynamic language determination or any other known or later developed method of determining the language.

After the reference language of the input or packed meaning representation has been determined, the implication determination circuit 45 is activated to determine unordered rewrite rules based on the packed meaning representation. The implication determination circuit may use linear implication derived from linear logic, or any other known or later developed method of determining a complete set of choices from the input disjunctions. In various other exemplary embodiments according to this invention, the unordered rewrite rules for a first disjunction are of the form:

fact1a fact1b -o pseudofact1 (for disjunction 1)
fact1c fact1d -o pseudofact1 (for disjunction 1)
fact2a fact2b -o pseudofact2 (for disjunction 2)
fact2c fact2d -o pseudofact2 (for disjunction 2)

Thus fact1a fact1b reflects one of the possible choices in disjunction 1 and fact 1c fact 1d reflects a second choice. Each of the choices is associated with the pseudofact 1. This allows alternate choices within a disjunction to be combined based on the shared semantic information. After the unordered rewrite rules have been determined, they are stored in the unordered rewrite rule storage 40.

The processor 15 then determines ordered rewrite rules for the input meaning by activating the ordered rewrite rule determination circuit 65. In various exemplary embodiments according to this invention, the ordered rewrite rules are determined based on the optionally determined reference language of the input meaning. For example, French language rules are determined from a French language grammar. In various other exemplary embodiments according to this invention, the ordered rewrite rules may be previously determined and stored in memory 20. However, it should be apparent that any method of determining the rewrite rules may be used without departing from the spirit or scope of this invention.

The processor 15 determines the input entries in the packed meaning representation. A phrasal information structure is determined by matching the input entries in the packed meaning representation against semantic information in a lexicon. For example, the "JE(X)" input element from the packed meaning representation is matched against the semantic information in a lexicon to determine the word "JE". The word "JE" is saved in the phrasal information structure as the source of the entry. Associated syntactic and semantic information are also saved in the phrasal information structure for each entry. The phrasal information structure is then stored in the phrasal information storage 30. The data structure for storing phrasal information may be a hash array, a linked list a generation chart or any known or later developed data structure useful in holding phrasal information.

The processor 15 compares each rule in the unordered rewrite rule storage 40 to the phrasal entries in the phrasal information structure stored in the phrasal information storage 30. The semantic information appearing on the left of the unordered rewrite rule is matched against the semantic information associated with each entry in the phrasal information structure. The semantic information for any phrase entries that match an unordered rewrite rule is replaced with the corresponding pseudofact associated with the unordered rewrite rule.

The processor 15 applies the ordered rewrite rules to the entries in the phrasal information structure. Various exemplary ordered rewrite rules are associated with left and right portions. For example, in a first exemplary embodiment according to this invention, a right hand side of an ordered rewrite rule may be constructed to consume or match two different phrase entries based on matching syntax. If the one or more phrase entries have syntax categories that match the rule, the processor activates the phrasal entry combination circuit 50 to create a combined phrase entry that is stored in the phrasal information storage 30. The new combined phrase entry has the syntax specified in the left hand portion of the rule. The context information for the combined phrase entry is the conjunction of the context of each of the individual combined phrase entries. The semantics of the combined phrase entry is the union of the semantics associated with each combined phrase entry with unordered rules applied to create pseudofacts.

Any entries in the phrasal information structure with the same syntactic and semantic information are merged into a single phrase entry and the contexts are disjoined. It will be apparent that combinations of entries in the phrasal information structure are possible because the substitution of pseudofact variables for semantic information abstracts over the semantic information.

The semantic variables for each of the multiple phrase entries produced by activating the incomplete semantic variable determination circuit 55. The missing fact in the set of entries is optionally subtracted from the context of any produced entry. That is, if the entry with the missing fact is in the "TRUE" context, and the context of the fact is "TRUE" then the context of the entry in the phrasal information structure is set to "TRUE-TRUE" or "FALSE". Setting the context to "FALSE", removes the entry in the phrasal information structure from further consideration.

When no further rewrite rules can be applied, the processor 15 determines if any entry in the phrasal information structure is associated with the "ALL" pseudofact.

If an entry in the phrasal information structure is associated with the "ALL" pseudofact, the generation circuit 60 is activated to determine the alternate phrases based on the source information. The process begins with the entry in the phrasal information structure associated with the "ALL" pseudofact. Additional entries in the phrasal information structure are selected based on the source. The entries in the phrasal information structure associated with the "ALL" pseudofact may be viewed as the root node of a tree reflecting each alternate phrase in the packed meaning representation.

In various exemplary embodiments, disjunctions within the alternate translated phrases are indicated by a group indicator such as open and close braces "{ }" and the like. Choices within each disjunction are indicated by a choice indicator such as a separating bar "|" and the like. It will be apparent however that alternate phrases may also be indicated using text highlighting, fluid text, drop down boxes, annotations or any known or later developed method of a marking of indicating alternate meanings. The translated alternate phrases are then returned over communication link 99 to the web-enabled personal computer 300.

In still other exemplary embodiments according to this invention, statistical methods may be used to narrow and/or select the likely alternate phrases based on statistical models of likelihood derived from prior analysis of a training corpus and the like. It will also be apparent that disjunctions may be embedded within other disjunctions or may be shared re-entrantly without departing from the spirit or scope of this invention.

FIG. 4 is an exemplary English language sentence. The exemplary sentence contains English language that has some ambiguity with respect to whether the verb "to saw" is associated with the concept of "sawing" something or the concept of "seeing" something. However, additional ambiguity may be induced when the sentence is translated into other languages. For example, depending on the overall context of the text, the English language word "light" may refer to: 1) a traffic light or 2) any other type of light etc. If the phrase is translated into French, the distinction between these two types of light must be made. Thus, if the English word "light" was intended to refer to a traffic light, the French phrase "FEU VERT" would be the best translation. If the English word "light" refers to some other type of light, the French phrase "LUMIERE VERTE" would be the best translation.

FIG. 5 shows a portion of an exemplary lexicon 600 for this language. The lexicon 600 is comprised of a word portion 610, a syntactic information portion 620 and a semantic information portion 630. The lexicon 600 associates word values contained in the word portion 610 with the values in the semantic information portion 630 and values in the syntactic information portion 620. The semantic information can then be used as an index into the lexicon to determine words corresponding to a determined meaning. Similarly, the words can be used to index into the lexicon 600 to determine the meaning or semantic information for a word.

The values in the syntactic information portion 620 reflect the Syntactic relations between the word. For example, the first row containing the word "JE" is associated with a syntactic information portion 620 value of "NP ISG(X)NP" and a semantic information portion 630 value of "JE(X)" using a neo-Davidsonian encoding of semantic and syntactic relationship information.

Similarly the second row of the exemplary lexicon 600 contains the Value "AI" in the word portion 610, the value "AUX ISG(X,Y)" in the syntactic information portion 620, and the value of "PRES(X) PERF(X)" in the semantic information portion 630. The value in the syntactic information portion 620 indicates that a first singular auxiliary verb relationship exists between the two arguments represented by the variables X and Y. The "PRES(X) PERF(X)" value in the semantic information portion 630 indicates a present perfect semantic relationship exits with respect to the variable "X".

As discussed above, in one of the exemplary embodiments according to this invention, the syntactic and semantic information is encoded using a neo-Davidsonian representation. A neo-Davidsonian representation encodes information about instances or events using variables. For example, the phrase "John wanted to see Bill" might be encoded in a neo-Davidsonian representation as:

JOHN(Y) WANT(W,Y,X) SEE(X,Y,Z) BILL(Z) PAST(W)

The "X" variable is used as the first argument to the verb "SEE" to indicate that "X" is about seeing something. The "X" variable is also used as the third argument of "WANT" indicating that seeing is what is wanted. The "Y" variable in "JOHN(Y)" indicates that "Y" is an instance of "JOHN". It will be apparent that although a neo-Davidsonian representation of meaning used in various exemplary embodiments of this invention, any known or later developed grammatical formalism such as unifications, tree adjoining grammars and the like may also be used in the practice of this invention.

The third word "VU" contains the value "V_PPT(X,Y,Z)" in the syntactic information portion 620 and contains the value "VOIR(X,Y,Z)" in the semantic information portion 630. The variables X, Y and Z are related through the "V_PPT(X,Y,Z)" syntactic relation and the "VOIR(X,Y,Z)" semantic relation thereby forming a set of semantic and syntactic constraints. Similarly the value "VOIR(X,Y,Z)" in the semantic information portion 630 indicates a semantic relation between the variables.

The fourth word "SCIE" contains the value "V ISG(X,Y,Z)" in the syntactic information portion 620 and contains the value "SCIER(X,Y,Z) PRES(x)" in the semantic information portion 630 indicating syntactic and semantic relations between the variables.

The fifth word "LE" contains the value "DET_MASC(X)" in the syntactic information portion 620 and contains the value "LE(X)" in the semantic information portion 630 similarly indicating syntactic and semantic relations between the variables.

The sixth word "LA" contains the value "DET_FEM(X)" in the syntactic information portion 620 and contains the value "LE(X)" in the semantic information portion 630 indicating syntactic and semantic relations between the variables. In various exemplary embodiments, the semantic information associated with the feminine article is optionally normalized to a masculine citation form. However, it will be apparent that the semantic information may be normalized to a feminine, neuter or any known or later developed normalized representation or citation form without departing from the scope of this invention.

The seventh word "VERT" contains the value "ADJ_MASC(X)" in the syntactic information portion 620 and contains the value "VERT(X)" in the semantic information portion 630. The "ADJ_MASC(X)" value in the syntactic information portion 620 indicates that the word "VERT" in the word portion 610 is a masculine adjective. The "VERT(X)" value in the semantic information portion 630 indicates the meaning or semantic relationship of the word.

The eighth word "VERTE" in the word portion 610 contains the value "ADJ_FEM(X)" in the syntactic information portion 620. This indicates the word "VERTE" is categorized as a feminine adjective. The value "VERT(X)" in the semantic information portion 630 indicates the semantics or meanings associated with the word "VERTE". As discussed above, the semantic information associated with the feminine adjective is optionally normalized to a masculine or citation form.

The ninth word "LUMIERE" contains the value "N_FEM(X)" in the syntactic information portion 620 indicating that the word "LUMIERE" is syntactically categorized as a feminine noun. The value "LUMIERE(X)" in the semantic information portion 630 indicate that the semantics or meaning of the word "LUMIERE".

The tenth word "FEU" contains the value "N_MASC(X)" in the syntactic information portion 620 indicating that the word "FEU" is identified syntactically as a masculine noun. The value "FEU(X)" in the semantic information portion 630 indicates the semantics or meaning associated with the word "FEU".

FIG. 6 is an exemplary data structure for storing ordered rewrite rules according to one aspect of this invention. The ordered rewrite rules may be determined from the language of the packed meaning representation. However it will be apparent that in various other exemplary embodiments, the ordered rewrite rules may be selected by the user or determined using any known or later developed method. The exemplary data structure for storing rewrite rules is comprised of a left hand syntactic information portion 710, an assignment operator 720 and a right hand syntactic information portion 730.

The values in the right hand syntactic information portion 730 indicate the constrained combinations or patterns of phrasal entries that will match the rule. When one or more entries in a phrasal information structure match the right hand syntactic information portion of a rule, entries in the phrasal information structure are combined to form a new entry or modify an existing entry. The syntactic information for the new phrase entry is based on the left hand portion of the ordered rewrite rule. It should be understood that although ordered rewrite rules are described in one of the various exemplary embodiments according to this invention, any method of combining and updating the entries in the phrase information structure based on syntactic constraints may be used in the practice of this invention.

FIG. 7 is an exemplary packed meaning representation 650. The exemplary packed meaning representation 650 derived by transferring the packed meaning representation for "I saw the green light" into French. The exemplary packed meaning representation is comprised of an index portion 660, a contexted fact portion 670 and a description portion 680. The index portion 660 identifies each of the contexted facts within the packed meaning representation.

The context fact portion 670 is comprised of context and fact information. In this exemple, facts are impliedly associated with the "TRUE" context unless otherwise indicated. The description portion 680 of the packed meaning representation 650 contains descriptions of the contexted fact. It will be apparent that a set of context free rules, a grammar, a regular expression or any known or later developed packed meaning representation may be used without departing from the scope of this invention.

In one of the various exemplary embodiments according to this invention, linear implications, derived from linear logic, are used to derive the unordered rewrite rules for a packed meaning representation. For example, "TRUE" contexted facts associated with the disjunctions are determined. An abstracting pseudofact is then associated with each disjunction of choices.

For example, the contexted fact "10" in the exemplary packed meaning representation 650 reflects a disjunction or P-OR node between the English verb "TO SEE" and the French verb "VOIR" and the alternate English verb "TO SAW" and the French verb "SCIER". One of the choices P1 or P2 must be present to satisfy the constraint "TRUE<-> one_of(P1,P2)" indicated in entry "10" of the packed meaning representation. Choice P1 requires "PERF(0) VOIR(0,1, 2)" as indicated by entries "3" and "4" in the packed meaning representation. Therefore, an unordered rewrite rule "PERF (0) VOIR(0,1,2,) -o P pseudofact" is determined. Similarly, choice P2 requires "SCIER(0,1,2)" as indicated by entry "5". Therefore, an unordered rewrite rule "SCIER(0,1,2) -o P pseudofact" is determined. When these unordered rewrite rules are applied, they provide for an abstraction over the P1 and P2 choices in the disjunction.

The process is repeated for each of the disjunctions in the exemplary packed meaning representation 650. Thus, since the Q1 choice requires the "LUMIERE(2)" fact then the unordered rewrite rule "LUMIERE(2) -o Q pseudofact" is determined. That is, if all the facts associated with one choice in the disjunction are satisfied, then the disjunction is satisfied. Choice Q2 similarly requires "FEU(2)" to be satisfied. Thus, the unordered rewrite rule "FEU(2)-o Q pseudofact" is determined. The application of these unordered rewrite rules provide for an abstraction over the Q1 and Q2 choices in the disjunction.

The elements of the packed meaning representation not associated with a disjunction are combined with the pseudofacts to form the "ALL" pseudofact rule. In the example, the "ALL" pseudofact unordered rewrite rule is associated with the constraints "JE(1) PRES(0) P LE(2) Q VERT(2)". When the constraints associated with this rewrite rule are satisfied, generation is possible.

FIG. 8 is an exemplary data structure for storing unordered rewrite rules 870 according to this invention. The exemplary data structure for storing unordered rewrite rules is comprised of a semantic information portion 840, an operator portion 850 and a pseudofact portion 860. The unordered rewrite rules reflect a partitioning of an exemplary packed meaning representation into disjunctions. In various exemplary embodiments according to this invention, the disjunctions are linked by pseudofacts. The pseudofacts reduce the number of alternate phrases based on the shared pseudofacts. However, it will be apparent that any method of determining and linking disjunctions may be used in the practice of this invention. An unordered rewrite rule associates a complete set of choices from the input disjunctions with the "ALL" pseudofact to reflect the possible choices of alternate phrases constrained by the rewrite rules.

The first row of the exemplary data structure for storing unordered rewrite rules contains the values "VOIR(0,1,2) PERF(0)" in the semantic information portion 840, the value "-o" in the operator portion 850 and the value "P" in the pseudofact portion 860. Similarly, the second row of the exemplary data structure for storing unordered rewrite rules contains the values "SCIER(0,1,2)" in the semantic information portion 840, the value "-o" in the operator portion 850 and the value "P" in the pseudofact portion 860.

The common pseudofact "P" shared by the first and second unordered rewrite rules indicates that the semantics "VOIR (0,1,2) PERF(0)" and "SCIER(0,1,2)" reflect the two alternate choices of phrases for the verb in the packed meaning representation.

The third row of the exemplary data structure for storing unordered rewrite rules contains the value "LUMIERE(2)" in the semantic information portion 840, the value "-o" in the operator portion 850 and the value "Q" in the pseudofact portion 860. Similarly, the fourth row of the exemplary data structure for storing unordered rewrite rules contains the value "FEU(2)" in the semantic information portion 840, the value "-o" in the operator portion 850 and the value "Q" in the pseudofact portion 860.

The common pseudofact "Q" that is shared by the third and fourth unordered rewrite rules indicates that the semantics "LUMIERE(2)" and "FEU(2)" reflect two alternate choices in the packed meaning representation. The fourth unordered rewrite rule reflects the set of phrases associated with the concept of "traffic light". In contrast the third unordered rewrite rule reflects the concept of any other type of light.

The fifth unordered rewrite rule reflects the selection of exactly one choice from the alternate phrases associated with the translation of "saw" and exactly one choice from the alternate phrases associated with the translation of the word "light". Since each alternate phrase is included in the fifth rule, the fifth rule is associated with the "ALL" pseudofact. Although one of the various exemplary embodiments according to this invention uses linear implications derived from linear logic to determine the disjunctions within the packed meaning representation, it will be apparent that any method of determining alternate disjunctions of phrases and helpful in collapsing the alternate phrases may also be used in the practice of this invention.

FIG. 9 shows a first alternate phrase generated according to one aspect of this invention. The first sentence reflects a first set of choices for the ambiguities contained in the sentence.

FIG. 10 shows a second alternate phrase generated according to one aspect of this invention. The second sentence reflects a second set of choices for the ambiguities contained in the sentence.

FIG. 11 shows a third alternate phrase generated according to one aspect of this invention. The third sentence reflects a third set of choices for the ambiguities contained in the sentence. In translations systems incorporating various exemplary embodiments according to this invention, additional domain information may be used to reduce the likelihood of the third sentence based on analysis of a training corpus and the like.

FIG. 12 shows a fourth alternate phrase generated according to one aspect of this invention. The fourth sentence reflects an additional set of choices for the ambiguities contained in the sentence. As discussed above, additional domain information may also be used to determine the likelihood of the fourth sentence based on additional information.

FIG. 13 is an exemplary phrasal information structure 900 according to one aspect of this invention. The exemplary phrasal information structure 900 is comprised of a phrasal information identifier portion 910, a context information portion 920, a syntactic information portion 930, a semantic information portion 940 and a source identifier portion 950.

The first ten rows of the exemplary phrasal information structure 900 reflect the entries from a lexicon that match the semantic information from the packed meaning representation. Additional syntactic and source information is also added. For example, the first row of the phrasal entry information structure 900 contains a "1" value in the phrasal information identifier portion 910. This indicates the first entry in the phrasal information structure 900.

The context information portion 920 contains the value "TRUE" indicating the first entry is in the "TRUE" context. The syntactic information portion 930 contains the value "NP_1SG(1)" indicating the syntactic categorization of the first entry. The semantic information portion 940 contains the "JE(1)" which indicates the semantics for the first phrase entry. The source information portion 950 indicates the origin of the combined entry in the phrasal information structure. Thus, semantic information from the packed meaning representation "JE(1)" is matched in a lexicon to the word "JE". The phrasal information structure is initialized with lexicon entries matching each semantic element in the packed meaning representation. Ordered and unordered rewrite rules are applied to the matching entries in the phrasal information structure whenever the constraints for the rules are matched. Moreover, when entries in the phrasal information structure 900 share the same syntactic and semantic information, the entries can be merged into a single entry. The merged entry in the phrasal information structure is associated with the source information of the each of the merged entries. The context information for the merged entries is disjoined.

The unordered rewrite rules are applied to the entries in the phrasal information structure. Thus, the third unordered rewrite rule is applied to the phrase information structure since the value of the semantic information portion 840 matches the initial value of the semantic information portion 940 of entry "9" in the phrasal information structure 900.

Thus, the initial semantic information value of "LUMIERE" in entry "9" of the phrasal information structure 900 is replaced by the "Q" pseudofact. Similarly, the fourth unordered rewrite rule matches entry "10" in the phrasal information structure 900. The value of the semantic information portion 940 for entry "10" is also replaced with the "Q" pseudofact. As discussed above, it will be apparent that the application of ordered and unordered rewrite rules and merging of entries in the phrasal information structure can occur whenever the phrasal information structure 900 contains entries that satisfy constraints associated with the ordered, unordered and merging rules.

The eleventh row of the phrasal information structure reflects a newly combined entry in the phrasal information structure 900. The entries are combined based on the ordered and unordered rewrite rules and selective merging and elimination. The entry in the row "11" of the phrasal information structure 900 is determined by applying the second ordered rewrite rule "N_FEM->N_FEM(X) ADJ_FEM(X)". The right hand portion of the ordered rewrite rule matches the syntactic information for entries "9" and "8" in the phrasal information structure 900. Therefore, a new entry in the phrasal information structure 900 is created.

The value of the context information portion 920 for the new combined entry "11" is formed from the conjunction of the contexts of entries "9" and "8". The conjunction of contexts may be determined using the methods described in co-pending, co-assigned U.S. patent application Ser. No. 10/338,846, entitled "Systems and Methods for Efficient Conjunction of Boolean Variables" by John T. MAXWELL III, herein incorporated by reference in its entirety. However, it should be apparent that any known or later developed method of determining a conjunction may be used in the practice of this invention.

The twelfth entry in the phrasal information structure reflects the application of the first ordered rewrite rule. The first ordered rewrite rule "N_MASC(X)->N_MASC(X) ADJ_MASC(X) operates on entries "7" and "10" in the phrasal information structure 900. The first ordered rewrite rule combines the entries "7" and "10" to produce entry "12" as indicated by the phrasal identifier portion 910. The value of the context portion 920 of entry "12" is the conjunction of the "TRUE" context and the "Q2" context from entries "7" and "10" respectively. The value of the semantic information portion 940 is the union of the "VERT(2)" and "Q" values associated with the seventh and tenth phrase entries. The value "N_MASC(2)" of the syntactic information portion 930 is based on the applied ordered rewrite rule. The source information 950 reflects each of the phrase entries that were combined to form the new phrase entry.

The third ordered rule "NP(X)->DET_FEM(X) N_FEM (X)" is then applied to the entries "5" and "10" to produce combined entry "13" in the phrasal information structure. Another application of the third ordered rewrite rule combines entries "6" and "9" to produce another combined entry. Since the two combined entries have the same values in the syntactic and semantic information portions 930-940, the two entries are merged into a single merged combined entry "13". The source information 950 for entry "13" reflects each of the two ways of combining the entries.

The fourth ordered rewrite rule is applied several times to produce multiple combined entries based on the entries "5+12" and "6+11". Since the multiple combined entries share syntactic and semantic information, the entries are also merged into single merged combined entry "14" as discussed above. The source information 950 for merged combined entry "14" reflects each way of combining the entries. The context information 920 for the new entry is disjoined. The merger of the two ways of constructing the entry is possible due to the collapse of the choices effected by the Q-pseudofact.

The seventh ordered rewrite rule "VP_PPT(X,Y)->V_PPT (X,Y,Z) NP(Z)" is applied to produce entries "15" and "16" in the phrasal information structure 900. However, entries "15" and "16" both contain the internal semantic variable (2). That is, variable (2) does not appear in value "VP_PPT(0,1)" contained in the syntactic portion 930 for the entry. The variable (2) is internal to the semantic portion 940. The semantic information for entry "15" and entry "16" differ. The semantics of entry "16" are associated with the "VERT(2)" semantic variable that is not present in "15". The "VERT(2)" semantic variable is associated with entry "7" in the phrasal information structure. The context of entry "15" is adjusted by subtracting the context of the VERT(2) fact in the input meaning. That is, the "TRUE" context of VERT(2) is subtracted from the "P1" context of phrase entry "15" yielding the "FALSE" context. Since phrase entry "15" is associated with the "FALSE" context, the entry is ignored in further steps.

The fifth ordered rewrite rule "VP_1SG(X,Y)->V_1SG (X,Y) NP(Z)" is applied to entries "4" and "13" to generate entry "17". As discussed above, the rule is also used to generate entry "18". Entries "17" and "18" have the same internal semantic variable (2). However, the entry "17" is incomplete since it lacks the semantic fact "VERT(2)". Therefore the context information portion 920 associated with entry "17" is adjusted to "FALSE". Entry "17" is therefore not considered in any further steps.

The fifth ordered rewrite rule "VP_1SG(X,Y)->V_1SG (X,Y) NP(Z)" is applied to the entries "4" and "14" to produce a combined entry "18" in the phrasal information structure, and the first unordered rewrite rule is applied to produce the P pseudofact. The fifth ordered rewrite rule is also applied to the "2" and "16" entries to produce another combined entry. The two ways of producing the same entry are combined since they share same semantic and syntactic information.

The eigth ordered rewrite rule "S(X)->NP_1SG(Y) VP_1SG(X,Y)" is applied to determine the combined entry "19" based on entries "1" and "18". The semantic information portion 940 of the entry "19" is replaced with the "ALL" pseudofact associated with the fifth unordered rewrite rule.

Generation is possible since the "ALL" pseudofact has been assigned to one of the entries in the phrase information structure 900. The source information portion 950 for entry "19" can be viewed as the root of a tree encoding the alternate phrases for the packed meaning representation.

Figure 14:
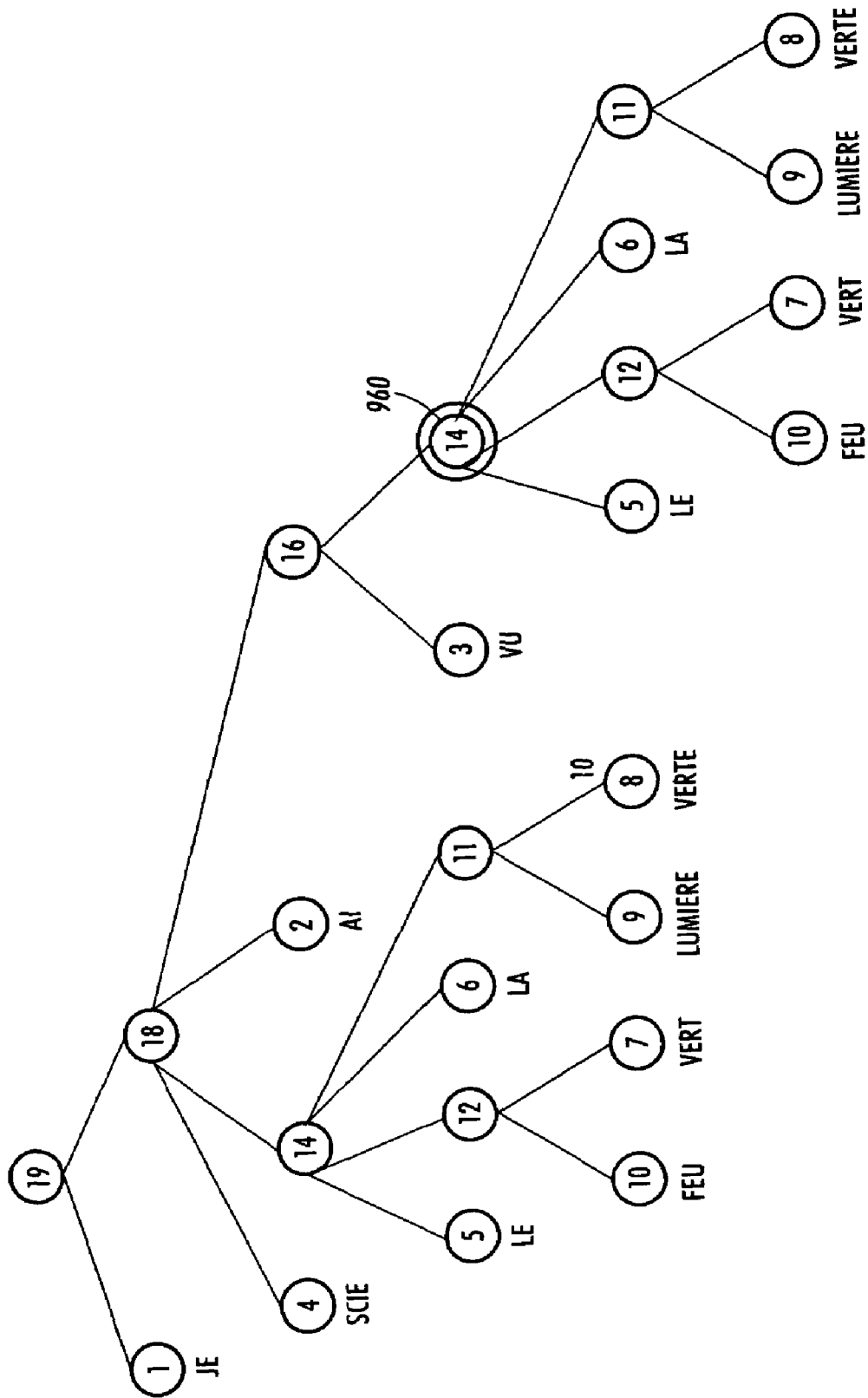
FIG. 14 shows an exemplary tree of alternate phrases generated from a packed meaning representation.

FIG. 14 shows an exemplary tree of alternate phrases generated from a packed meaning representation. The alternate phrases may be viewed as tree rooted at the entry in the phrasal information structure associated with the "ALL" pseudofact. Thus, entry "19" in the phrasal information structure can be viewed as the exemplary root node in a phrasal information structure. The terminal nodes reflect words from a lexicon. A bottom up reading of the tree of alternate phrases indicates that after selecting either the verb "VOIR" or the verb "SCIER" each of the subsequent alternate phrases share the subtree rooted at node 14. The subtree rooted at node "14" reflects alternate phrase entries "LE FEU VERT" and "LA LUMIERE VERTE" as possible phrase choices.

Node 18 in the tree indicates the existence of two alternate phrases for the translation of the English language verb "SAW". Thus, node 4 associated with the French verb "SCIER" is one of the choices to be made in generating alternate phrases from the packed meaning representation. Nodes 2, 16 and 3 indicate that the past tense of the French verb "VOIR" is another of the choices to be made in generating alternate phrases from the packed meaning representation. Since each choice of verb shares the same subtree of alternate phrase choices for the remainder of the sentence, the subtree rooted at node 14 need only be determined once. The first subtree rooted at node 14 is then copied to form a second subtree 960.

Node 1 associated with the word "JE" is shared by each alternate phrase as indicated by the position within the tree at a terminal node immediately below the root node 19.

The tree may also be read from the top down. Thus, node 19 links the French pronoun "JE" of node 1 with the possible phrases associated with the subtree rooted at node 18. Node 18 links node 4 associated with the French verb "SCIER" with the alternate phrases associated with the subtree rooted at node 14.

Node 18 alternatively links node 2 and node 16 to indicate that the past tense of the French verb "AVOIR" is linked with the alternate phrases rooted at node 16. Node 16 links the French verb phrase "VOIR" with the alternate choices rooted at node 14.

Each of the alternate phrase subtrees 14 link the terminal nodes 10 and 7 associated with the words "FEU", and "VERT" and the terminal nodes 9 and 8 associated with "LUMIERE" and "VERTE" to their respective articles associated with nodes 5 and 6. Phrases can be read off the tree by applying an untokenizer to the words at the leaves of the tree. (e.g. "JE AI" becomes "J'AI") It should be evident that any technique for dealing with the morphology or tokenization of a language can be incorporated without departing from the spirit or scope of this invention.

FIG. 15 shows a first exemplary user interface for presenting alternate phrases according to one aspect of this invention. Each of the choices is contained within open and close braces "{ }". Alternate choices are divided by a bar "|". Thus, the first exemplary user interface provides a compact representation of each of the alternate phrases.

FIG. 16 shows a second exemplary user interface for presenting alternate phrases 1400 according to another aspect of this invention. The user interface for presenting alternate phrases 1400 is comprised of a candidate alternate phrase display portion 1410. The candidate alternate phrase display portion 1410 is comprised of first and second portions 1420-1430 respectively. In various exemplary embodiments according to this invention, the phrases are presented in the candidate alternate phrase display portion 1410 based on statistical models, rule priorities or ordered based on any known or later developed phrase ranking method.

The most likely alternate phrase is presented in the candidate alternate phrase display portion 1410. The alternate phrases are displayed in the first and second portions 1420 and 1430. The first and second portions 1420-1430 are indicated by bounding boxes, italics, text bolding, color or any other known or later developed human sensible display characteristic. In one of the various exemplary embodiments according to this invention, a bounding box surrounding the first portion 1420 of the candidate alternate phrase display portion 1410 indicates one of the P-OR node choices.

The second portion 1430 of the candidate phrase display portion 1410 contains the value "LA LUMIERE VERTE" indicating one of the Q-OR node choices. Bounding boxes or other human sensible display characteristic indicate that additional phrases can be viewed by selecting the first or second portion 1420-1430 of the candidate alternate phrase display portion 1410.

FIG. 17 shows another aspect of the second exemplary user interface for presenting alternate phrases 1400 according to this invention. The user interface for presenting alternate phrases 1400 presents two alternate phrases. In the candidate alternate display portion 1410. The candidate phrase display portion 1400 is comprised of a first portion 1420 and first and second instances of a second portion 1430-1431. The first portion 1420 of the candidate alternate phrase display portion reflects the specific P-OR node choice associated with the past tense of the English verb "TO SEE" or the past tense of the French verb "VOIR".

When the cursor 1440 or other indicator is moved over the second portion 1430 of the candidate alternate phrase display portion 1410, the subtree of phrases associated with the alternate "LA LUMIERE VERTE" and "LE FEU VERT" are displayed as first and second instances 1430-1431. In various exemplary embodiments according to this invention, statistical models, rules, discourse level information or known or later information helpful in ranking the alternate choices may also be used to rank the alternate phrases within the candidate alternate phrase display portion 1410.

The second instance of the second portion 1431 of the exemplary phrase is associated the English language phrase a "green traffic light" as reflected in the Q-OR node choice Q1. The user interface for presenting alternate phrases 1400 facilitates access to the most likely phrases within the packed meaning representation while also allowing consideration of less likely alternate phrases. It will be apparent that in various other exemplary embodiments according to this invention, additional instances of portions of the alternate phrases are presented using pop-up windows, balloon windows, or any other user interface component useful in informing the user of the alternate choices available.

Figure 18:
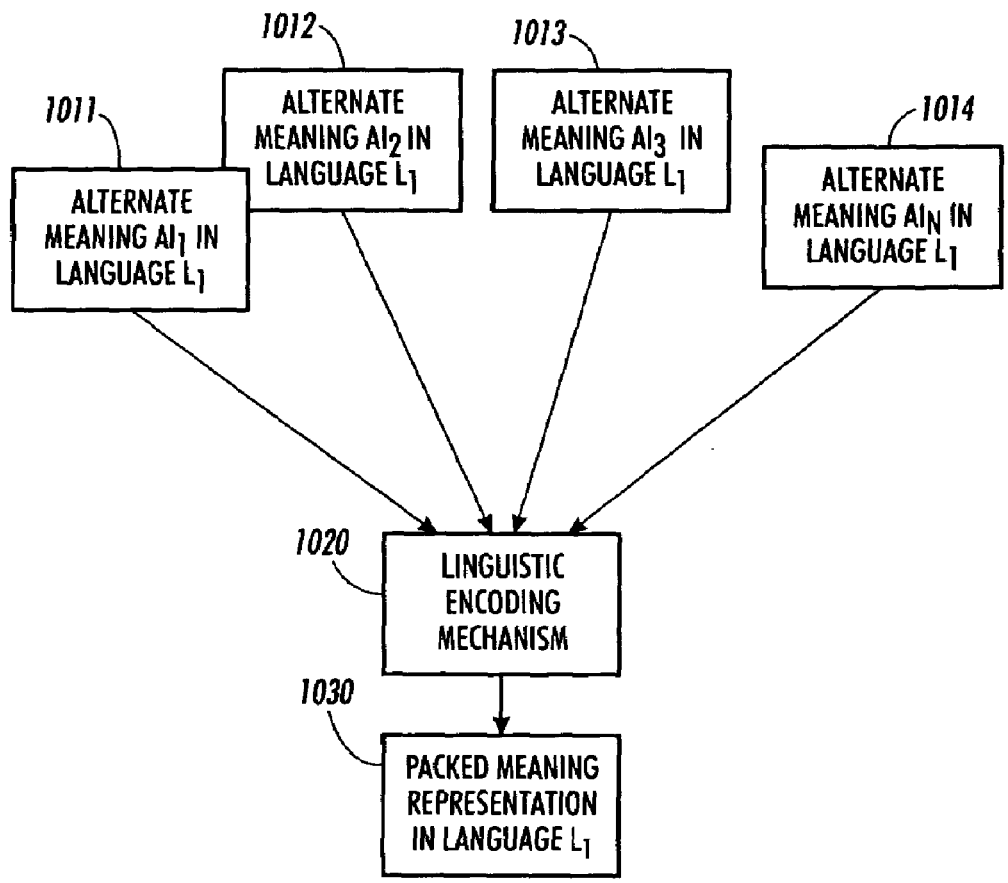
FIG. 18 is a flow diagram showing an exemplary encoding of alternate meanings into a packed meaning representation.

FIG. 18 is a flow diagram showing an exemplary encoding of alternate meanings into a packed meaning representation. The alternate meaning $AI_1$ 1011 for a phrase is parsed and/or encoded by the linguistic encoding mechanism 1020 into a packed meaning representation 1030. Similarly, the alternate meanings $AI_2$-$AI_n$ 1012-1014 are also encoded by the linguistic encoding mechanism 1020.

Figure 19:
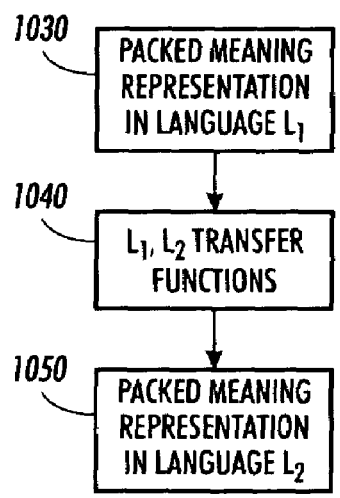
FIG. 19 is an overview of an exemplary translation system according to one aspect of this invention.

FIG. 19 is an overview of an exemplary translation system according to one aspect of this invention. The translation system translates the elements of the packed meaning representation directly using $L_1L_2$ transfer functions. Thus, the meaning of the source language sentence can be efficiently translated into a second language meaning. The resolution of latent and/or induced ambiguities in the translated packed meaning representation is delayed until the generation phrase. In some cases, if a phrase that preserves the ambiguity between the two languages can be found, no resolution of the meaning of the phrase is required.

Figure 20:
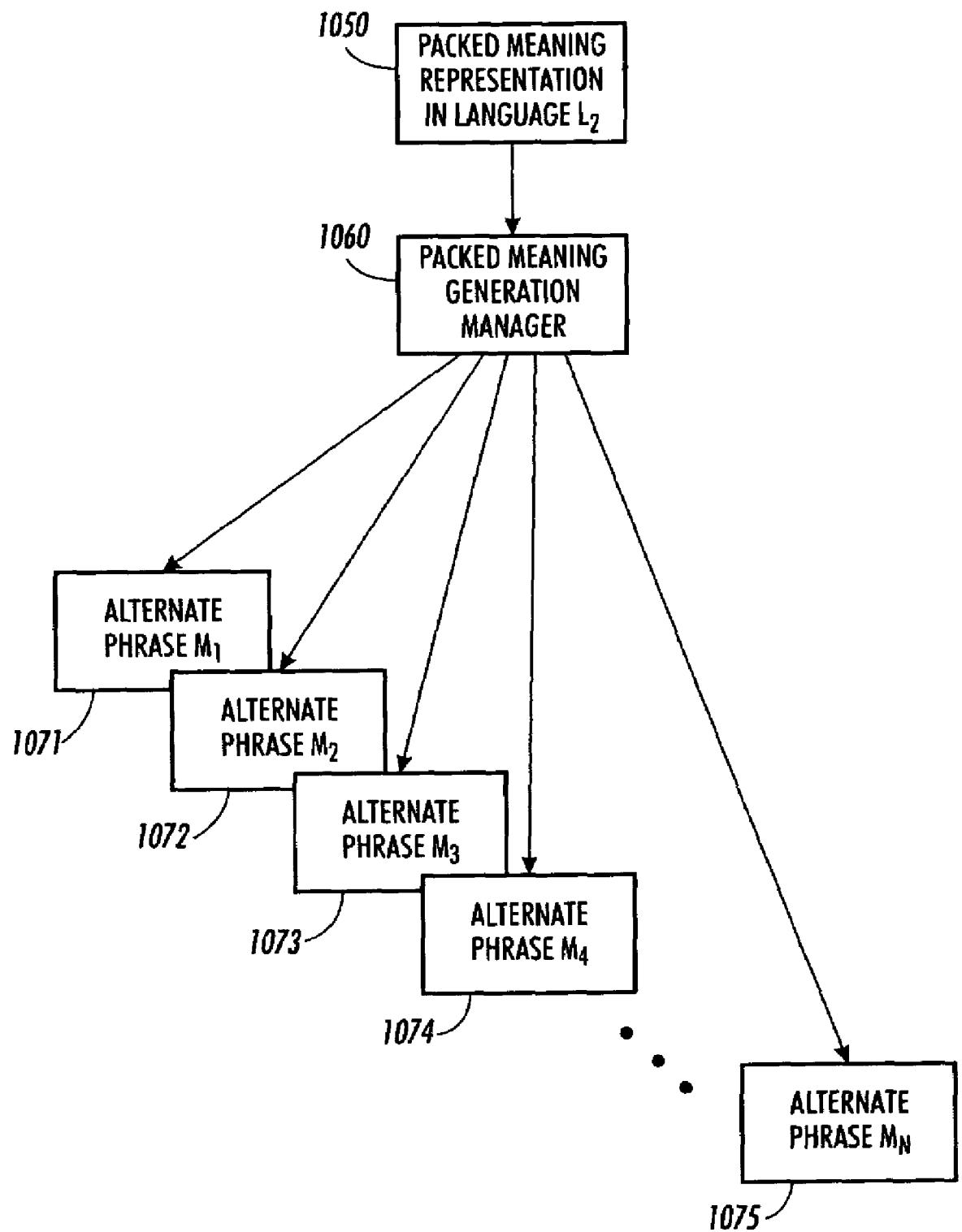
FIG. 20 is an exemplary overview of the generation of alternate phrases according to one aspect of this invention.

FIG. 20 is an exemplary overview of the generation of a set of alternate phrases 1070 according to one aspect of this invention. The set of alternate phrases 1070 is comprised of individual alternate phrases $M_1$ through $M_n$ 1071-1075. The packed meaning generation manager 1060 receives a packed meaning representation for language $L_2$ 1050. The packed meaning generation manager 1060 determines the set of alternate phrases 1070 for the language $L_2$.

Each of the circuits 10-65 of the packed meaning generation manager or system 100 outlined above can be implemented as portions of a suitably programmed general-purpose computer. Alternatively, 10-65 of the packed meaning generation manager or system 100 outlined above can be implemented as physically distinct hardware circuits within an ASIC, or using a FPGA, a PDL, a PLA or a PAL, or using discrete logic elements or discrete circuit elements. The particular form each of the circuits 10-65 of the packed meaning generation manager or system 100 outlined above will take is a design choice and will be obvious and predicable to those skilled in the art.

The packed meaning generation manager or system 100 and/or each of the various circuits discussed above can each be implemented as software routines, managers or objects executing on a programmed general purpose computer, a special purpose computer, a microprocessor or the like. In this case, the packed meaning generation manager or system 100 and/or each of the various circuits discussed above can each be implemented as one or more routines embedded in the communications network, as a resource residing on a server, or the like. The packed meaning generation manager or system 100 and the various circuits discussed above can also be implemented by physically incorporating the packed meaning generation manager or system 100 into a software and/or hardware system, such as the hardware and software systems of a web server or a client device.

As shown in FIG. 3, memory 20 and phrasal information storage 30, ordered rewrite rule storage 35 and unordered rewrite rules storage 40 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1 and 3 can each be any known or later developed device or system for connecting a communication device to the packed meaning generation manager or system 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication.

Further, it should be appreciated that the communication links 99 can be a wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of packed meaning generation comprising the steps of:
    determining unordered rewrite rules and ordered rewrite rules based on a packed meaning representation, wherein unordered rewrite rules in semantic relation are associated with a corresponding pseudofact variable such that each pseudofact variable is associated with multiple unordered rewrite rules;
    determining entries in a phrasal information structure based on the packed meaning representation and a lexicon and in which the entries are comprised of syntactic information semantic, information, and corresponding source information associated with the lexicon;
    substituting pseudofact variables into the phrasal information structure for matching semantic information based on the unordered rewrite rules;
    combining entries in the phrasal information structure based on the ordered rewrite rules, syntactic and semantic information;
    merging entries in the phrasal information structure where the syntactic and semantic information of the entries indicate equivalent meaning;
    determining a root phrasal entry in the phrasal information structure;
    determining alternate phrases based on the source information for the determined root phrasal entry to form a resulting packed meaning representation; and
    displaying the resulting packed meaning representation on a user interface in a tree structure in relation to the determined root phrasal entry.

2. The method of claim 1, further comprising the step of determining a language of the packed meaning representation.

3. The method of claim 2, in which the language is determined based on at least one of: dynamically and statically.

4. The method of claim 2, in which the language is determined based on at least one of: a tag, a feature associated with the language.

5. The method of claim 1, in which at least one rewrite rule is associated with an "ALL" pseudofact and wherein the root phrasal entry is associated with the "ALL" pseudofact.

6. The method of claim 5, in which alternate phrases are determined based on a tree of alternate phrases rooted at the entry in the phrasal information structure associated with the "ALL" pseudofact.

7. The method of claim 1, further comprising the step of ignoring entries associated with a false context.

8. The method of claim 1, further comprising the step of adjusting the context of an entry in the phrasal information structure based on the context of facts missing from an internal semantic variable.

9. The method of claim 1, in which the phrasal information structure is at least one of: a hash array, a linked list and an array.

10. The method of claim 1, in which the ordered rewrite rules are determined based on a language of the packed meaning representation.

11. The method of claim 10, in which the ordered rewrite rules are based on a grammar for the language.

12. The method of claim 1, in which the ordered rewrite rules are determined based on at least one of: dynamically and statically.

13. The method of claim 1, in which the unordered rewrite rules are determined based on linear implication.

14. The method of claim 1, in which syntactic information, semantic information, and source information for each entry in the phrasal information structure is contained in at least two records.

15. The method of claim 1, in which syntactic information, semantic information, and source information for each entry in the phrasal information structure is contained in the same record.

16. The method of claim 1, in which entries in the phrasal information structure associated with a false context are removed from the phrasal information structure.

17. A packed meaning generation system comprising:
an input/output circuit for receiving information;
a memory;
a processor that determines unordered rewrite rules and ordered rewrite rules based on a packed meaning representation, wherein unordered rewrite rules in semantic relation are associated with a corresponding pseudofact variable such that each pseudofact variable is associated with multiple unordered rewrite rules, where the processor determines entries in a phrasal information structure based on the packed meaning representation and a lexicon and in which the entries are comprised of syntactic information, semantic information, and corresponding source information associated with the lexicon, and where the processor substitutes pseudofact variables into the phrasal information structure for matching semantic information based on the unordered rewrite rules;
a phrasal entry combination circuit that combines entries in the phrasal information structure based on the ordered rewrite rules, syntactic information, and semantic information;
wherein the processor merges entries in the phrasal information structure where the syntactic and semantic information of the entries indicate equivalent meaning and determines a root phrasal entry in the phrasal information structure; and
a generation circuit that determines alternate phrases based on the source information for the determined root phrasal entry to form a resulting packed meaning representation.

18. The system of claim 17, in which the processor determines a language of the packed meaning representation.

19. The system of claim 18, in which the language is determined based on at least one of: dynamically and statically.

20. The system of claim 18, in which the language is determined based on at least one of: a tag, a feature associated with the language.

21. The system of claim 17, in which one of the determined rewrite rules is associated with an "ALL" pseudofact and wherein the root phrasal entry in the phrasal information structure is associated with the "ALL" pseudofact.

22. The system of claim 21, in which alternate phrases are determined based on a tree of alternate phrases rooted at the entry in the phrasal information structure associated with the "ALL" pseudofact.

23. The system of claim 17, in which entries associated with a false context are ignored.

24. The system of claim 17, in which the context of an entry in the phrasal information structure is adjusted based on the context of facts missing from an internal semantic variable.

25. The system of claim 17, in which the phrasal information structure is at least one of: a hash array, a linked list and an array.

26. The system of claim 17, in which the ordered rewrite rules are determined based on a language of the packed meaning representation.

27. The system of claim 26, in which the ordered rewrite rules are based on a grammar for the language.

28. The system of claim 17, in which the ordered rewrite rules are determined based on at least one of: dynamically and statically.

29. The system of claim 17, in which the unordered rewrite rules are determined based on linear implication.

30. The system of claim 17, in which syntactic information, semantic information, and source information for each entry in the phrasal information structure is contained in at least two records.

31. The system of claim 17, in which syntactic information, semantic information, and source information for each entry in the phrasal information structure is contained in the same record.

32. The system of claim 17, in which entries in the phrasal information structure associated with a false context are removed from the phrasal information structure.

33. Computer readable storage medium comprising:
computer readable program code embodied on the computer readable storage medium, the computer readable program code usable to program a computer for packed meaning generation comprising the steps of:
determining unordered rewrite rules and ordered rewrite rules based on a packed meaning representation, wherein unordered rewrite rules in semantic relation are associated with a corresponding pseudofact variable such that each pseudofact variable is associated with multiple unordered rewrite rules;
determining entries in a phrasal information structure based on the packed meaning representation and a lexicon and in which the entries are comprised of syntactic information, semantic information, and corresponding source information associated with the lexicon;

substituting pseudofact variables into the phrasal information structure for matching semantic information based on the unordered rewrite rules;

combining entries in the phrasal information structure based on the ordered rewrite rules, syntactic information, and semantic information;

merging entries in the phrasal information structure where the syntactic and semantic information of the entries indicate equivalent meaning;

determining a root phrasal entry in the phrasal information structure; and determining alternate phrases based on the source information for the determined root phrasal entry to form a resulting packed meaning representation.

34. A processor that executes instructions for packed meaning generation, the instructions comprising:

instructions for determining unordered rewrite rules and ordered rewrite rules based on a packed meaning representation, wherein unordered rewrite rules in semantic relation are associated with a corresponding pseudofact variable such that each pseudofact variable is associated with multiple unordered rewrite rules;

instructions for determining entries in a phrasal information structure based on the packed meaning representation and a lexicon and in which the entries are comprised of syntactic information, semantic information, and corresponding source information associated with the lexicon;

instructions for substituting pseudofact variables into the phrasal information structure for matching semantic information based on the unordered rewrite rules;

instructions for combining entries in the phrasal information structure based on the ordered rewrite rules, syntactic information, and semantic information;

instructions for merging entries in the phrasal information structure where the syntactic and semantic information of the entries indicate equivalent meaning;

instructions for determining a root phrasal entry in the phrasal information structure; and instructions for determining alternate phrases based on the source information for the determined root phrasal entry to form a resulting packed meaning representation.

35. A means of packed meaning generation comprising:

a means for determining unordered rewrite rules and ordered rewrite rules based on a packed meaning representation, wherein unordered rewrite rules in semantic relation are associated with a corresponding pseudofact variable such that each pseudofact variable is associated with multiple unordered rewrite rules;

a means for determining entries in a phrasal information structure based on the packed meaning representation and a lexicon and in which the entries are comprised of syntactic information, semantic information, and corresponding source information associated with the lexicon;

a means for substituting pseudofact variables into the phrasal information structure for matching semantic information based on the unordered rewrite rules;

a means for combining entries in the phrasal information structure based on the ordered rewrite rules, syntactic information, and semantic information;

a means for merging entries in the phrasal information structure where the syntactic and semantic information of the entries indicate equivalent meaning;

a means for determining a root phrasal entry in the phrasal information structure; and a means for determining alternate phrases based on the source information for the determined root phrasal entry to form a resulting packed meaning representation.

36. A method of packed meaning generation comprising the steps of:

determining unordered rewrite rules and ordered rewrite rules based on an initial packed meaning representation of a selected text, wherein unordered rewrite rules in semantic relation are associated with a corresponding pseudofact variable such that each pseudofact variable is associated with multiple unordered rewrite rules;

determining entries in an initial phrasal information structure for the selected text based on the initial packed meaning representation and a lexicon and in which the entries in the initial phrasal information structure are comprised of syntactic information, semantic information, and corresponding source information associated with the lexicon;

substituting pseudofact variables into the initial phrasal information structure for matching semantic information based on the unordered rewrite rules;

combining entries in the initial phrasal information structure based on the ordered rewrite rules, syntactic information, and semantic information to form a combined phrasal information structure for the selected text;

merging entries in the combined phrasal information structure where the syntactic and semantic information of the entries indicate equivalent meaning to form a merged phrasal information structure for the selected text;

determining a root phrasal entry in the merged phrasal information structure;

determining alternate phrases for the selected text based on the source information for the determined root phrasal entry transforming the initial packed meaning into a resulting packed meaning representation; and displaying the resulting packed meaning representation on a user interface in a tree structure in relation to the determined root phrasal entry.

37. A resulting packed meaning generation system comprising:

an input/output circuit for receiving information;

a memory;

a processor that determines unordered rewrite rules, ordered rewrite rules, and a resulting packed meaning representation based on an initial packed meaning representation of a selected text, wherein unordered rewrite rules in semantic relation are associated with a corresponding pseudofact variable such that each pseudofact variable is associated with multiple unordered rewrite rules, where the processor determines entries in an initial phrasal information structure for the selected text based on the initial packed meaning representation and a lexicon and in which the entries in the initial phrasal information structure are comprised of syntactic information, semantic information, and corresponding source information associated with the lexicon, and where the processor substitutes pseudofact variables into the phrasal information structure for matching semantic information based on the unordered rewrite rules;

a phrasal entry combination circuit that combines entries in the initial phrasal information structure based on the ordered rewrite rules, syntactic information, and semantic information to form a combined phrasal information structure for the selected text, and which determines source information associated with each combined entry in the combined phrasal information structure based on the source information of each of the corresponding combined entries;

wherein the processor merges entries in the combined phrasal information structure where the syntactic and semantic information of the entries indicate equivalent meaning to form a merged phrasal information structure for the selected text and determines a root phrasal entry in the merged phrasal information structure; and a generation circuit that determines alternate phrases for the selected text based on the source information for the determined root phrasal entry to form a resulting packed meaning representation.

38. A method of transforming input data into a resulting packed meaning generation comprising the steps of:

entering user specified input data through a computer operable interface;

retrieving text from a computer data storage medium;

encoding the retrieved text using a computer processor to generate an initial packed meaning;

determining ordered rewrite rules based on at least one of the user input data and the elements of initial packed meaning data;

determining unordered rewrite rules based on linear implications of linear logic derived from the packed meaning representation and the ordered rewrite;

deriving entries for populating an initialized phrasal information structure based on matches occurring between the initial packed meaning representation and a lexicon in which each entry is comprised of a word portion, a syntactic information portion and semantic information portion;

identifying each match occurring between the semantic information and the packed meaning into the phrasal information structure and replacing each match with a pseudofact;

determining each combination of phrasal entries in the phrasal information structure based on ordered rewrite rules, syntactic and semantic information that are not associated with a false context;

identifying each match occurring between the unordered rule and the phrasal semantic information structure and replacing each match with a pseudofact;

determining a source entry for each combination of phrasal entries;

removing from the phrasal information structure any entry based on a missing fact;

merging phrasal entries which have identical syntactic information, semantic information and equivalent meaning-into the phrasal information structure;

deciding if another rewrite rule should be applied;

determining one entry source information associated with a pseudofact "ALL" to be a one and only root;

determining a resulting packed meaning based on the phrasal information structure comprised of at least one word that did not occur in the initial packed meaning; and graphically presenting a resulting packed meaning on a computer output display medium.

\* \* \* \* \*